(12) United States Patent
Maltsev et al.

(10) Patent No.: US 10,198,877 B1
(45) Date of Patent: Feb. 5, 2019

(54) PROVIDING A COMMUNICATIONS CHANNEL BETWEEN INSTANCES OF AUTOMATED ASSISTANTS

(71) Applicant: Google LLC, Mountain View, CA (US)

(72) Inventors: Alexandr Maltsev, Mountain View, CA (US); Vikram Aggarwal, Palo Alto, CA (US); Moises Morgenstern Gali, San Francisco, CA (US); Joseph Pirozzo, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/009,116

(22) Filed: Jun. 14, 2018

Related U.S. Application Data

(60) Provisional application No. 62/675,342, filed on May 23, 2018.

(51) Int. Cl.
| H04L 29/08 | (2006.01) |
| G07C 5/00 | (2006.01) |
| H04W 4/40 | (2018.01) |
| G07C 5/08 | (2006.01) |

(52) U.S. Cl.
CPC ............. *G07C 5/008* (2013.01); *G07C 5/006* (2013.01); *G07C 5/0825* (2013.01); *H04L 67/14* (2013.01); *H04W 4/40* (2018.02)

(58) Field of Classification Search
CPC ...................................................... H04L 67/18
See application file for complete search history.

(56) References Cited

U.S. PATENT DOCUMENTS

| 2007/0042812 | A1 | 2/2007 | Basir | |
| 2010/0127847 | A1* | 5/2010 | Evans | G06F 3/04817 340/461 |
| 2010/0184406 | A1 | 7/2010 | Schrader | |
| 2013/0117021 | A1 | 5/2013 | James | |
| 2014/0309868 | A1* | 10/2014 | Ricci | G06K 9/00355 701/36 |

* cited by examiner

Primary Examiner — Adnan M Mirza
(74) Attorney, Agent, or Firm — Middleton Reutlinger

(57) ABSTRACT

Implementations relate to interactions, over a wireless communication modality, between an automated assistant of an automobile computer system, and separate client device(s). In some of those implementations, the client device(s) can be paired with the automobile computer system, and the client device(s) and the automobile computer system can include separate instances of an automated assistant, which can be associated with different user accounts. In some additional or alternative implementations, particular actions to be performed by a local application of a client device can be advanced via user interaction with the automobile automated assistant, despite a counterpart to the local application not being installed directly on automobile computer system. For example, despite an automobile computer system not having a third-party messaging application installed, the automobile automated assistant can access requested actions to be performed by the third-party messaging application in order to further a requested action. The automobile computer system can transmit, via the wireless communication modality, content to cause the third-party application to further the requested action.

12 Claims, 9 Drawing Sheets

PROVIDING A COMMUNICATIONS CHANNEL BETWEEN INSTANCES OF AUTOMATED ASSISTANTS

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input.

Automated assistants can be installed at a variety of different devices such as, for example, mobile phones and personal computers. A user can cause a particular application at a mobile phone or a personal computer to perform a particular action by interacting with a respective automated assistant. However, in order to exhibit uniformity of functionality across different devices, a user may be required to install instances of the same application synchronously across the different devices. As a result, network bandwidth may be quickly preoccupied with transmitting duplicative application updates for each instance of the application and generally communicating data between each instance of the application. Moreover, as each instance of the application may require some amount of disk space on their respective device, memory allocation across devices may be employed inefficiently.

In some contexts, interacting with a particular application via an automated assistant may not be convenient depending on how engaged a user may be in a particular environment, and/or whether other devices are being operated by other users nearby. For instance, replying to messages via an automated assistant on a mobile phone can be difficult while the user is driving in a vehicle. Furthermore, when the user is driving with other people in the vehicle, those people may also have devices with automated assistants, which may be indirectly invoked as the user engages with their respective automated assistant. Such a result can create an environment of heightened distractions while driving, and waste computational resources at those devices that may be inadvertently affected.

SUMMARY

Implementations set forth herein relate to systems, methods, and apparatuses for providing a communications channel through which separate instances or installations of automated assistants can communicate in order to further a particular action. The communications channel can be provided between a principal automated assistant (e.g., either an automobile automated assistant or a client device automated assistant) and one or more subsidiary automated assistants (e.g., the other of the automobile automated assistant and the client device automated assistant). For instance, a principal automated assistant can be one that is preferred by a user in a particular context, such as riding in an automobile. Specifically, an automobile computer system can include an automated assistant that is preferred by a user for furthering particular actions while the user is riding in the vehicle. According to settings of the automobile and/or a client device, the automobile automated assistant, as principal, can assume any pending intents and/or actions of a subsidiary automated assistant when the client device connects to the automobile computer system. In this way, the automobile automated assistant can act as an extension of the subsidiary automated assistant. This can allow any client-side applications to tunnel or channel particular intents and/or actions to and/or from the automobile automated assistant. Furthermore, such tunneling can provide a system architecture that supports an ability of the user to engage with their respective client-side applications, without necessarily employing or installing any correlated "automobile-side" applications at the automobile computer system. In this way, a more efficient use of automobile-side memory can be effectuated through not necessarily requiring such correlated, third-party applications to be installed on every automobile-side device. Furthermore, network traffic and wasteful power consumption would be mitigated as a result of the user merely relying on their automated assistants to communicate with at least a single instance of an application, rather than employing multiple instances of multiple applications to synchronously operate. In particular, a reduction in network and computational resources can be exhibited by messaging servers and applications that would otherwise send duplicative copies of messages and confirmation receipts to a variety of different devices.

For instance, in some implementations, an automobile automated assistant of a vehicle can be employed to communicate a message received at a third-party application of a client device, such as a mobile phone, and respond to the message according to an interaction between a user and the automobile automated assistant. In order to achieve such functionality, the client device and an automobile computer system of the automobile can perform a handshake, in order to establish a secure communication channel between the client device and the automobile computer system. Specifically, the client device can assign one or more network sockets (e.g., a Bluetooth socket(s)) as nodes for transmitting data to and/or from the automobile computer system. When a secure communication channel has been established between the client device and the automobile computer system, action intents can be shared between the client automated assistant and the automobile automated assistant.

An action intent can refer to a request from an application, for a particular action to be performed via the application or a separate application. For instance, an action intent request can be generated by a third-party application and identify one or more of an action to be performed, a custom identifier, content data that is associated with the action to be performed, and/or any other data that can be associated with an action to be performed by an application. The action intent can be initially received by an operating system, device application, automated assistant, and/or any other engine or module available of the device at which the action intent was originated. The action intent can then be cataloged, or otherwise queued, at the originating device, and made accessible to one or more instances of the automated assistant. For example, a client automated assistant of the originating client device can access the pending action intent, and, when the client device is paired with an automobile computer system, an automobile automated assistant can access the pending action intent.

In furtherance of the aforementioned example, the automobile automated assistant can communicate with the client automated assistant to identify a pending action intent request. The action intent request can be associated with a message that was received at a third-party application of the client device while the user was riding in the automobile. The term "third party" can refer to an entity that created and/or provided the third-party application, and is different than a creator and/or provider of the client device, the client automated assistant, and/or a client operating system. By accessing the action intent request at the client device, the automobile automated assistant can act as an intermediary through which the user can further particular pending action intent requests. Furthermore, the automobile automated assistant can cause a corresponding instance of the action intent request, as well as any other action intent requests that might be pending at the client device, to be generated at the automobile computer system. The corresponding instances of the action intent requests at the automobile computer system can be handled by the automobile automated assistant, despite the automobile computer system being void of the third-party application that originated the message.

The automobile automated assistant can determine that the action intent request is associated with a message based on the content of the action intent request, and, in some implementations, regardless of the third-party application that provided the action intent request. In this way, the automated assistant can manage action intents from a variety of different applications, seemingly agnostic with respect to the applications that are originating the action intents. For instance, a first service provider of a first application and a second service provider of a second application can each provide messages in different manners, however, the respective messages will have a "body" and a "sender" field regardless. The overlap in the structure of messages, which, in some implementations can be in part due to a respective application satisfying an API, can allow each message to be similarly parsed. An automated assistant can then use any parsed data from a respective message to provide notifications, respond to message, and/or perform any other action that can be associated with a message. In some implementations, similar overlaps can be exhibited by other applications capable of interacting with an automated assistant. Such other applications can include navigation applications, where contents of a notification can include route steps, and/or media applications, where contents of a notification can include an address of particular media data, such as an image and/or a video.

When the automobile automated assistant determines that the corresponding instance of the action intent request is associated with a message, the automobile automated assistant can cause the contents of the corresponding instance to be parsed. The parsed contents can be used to identify separate portions of the message, such as the body, the author, the subject, a sent and/or received time, and/or any other data that can be associated with a message. Because the automobile automated assistant has determined that the action intent request corresponds to a message, the automobile automated assistant can use the parsed contents in order to present the parsed contents to the user. For instance, the automobile automated assistant can employ a text-to-speech engine for converting at least a portion of the content of the action intent request into audio that can be output from an automated assistant interface, such as an audio system, of the automobile computer system. The audio can be, for example, "You received a text message from 'Emily,' which she says, 'I will be running late.'" The author "Emily" and the body "I will be running late" can be based on data that was parsed from the corresponding instance of the action intent request.

In response to notifying the user of the message received at their client device, the automobile automated assistant can follow up with a prompt, which can present the user with the option to reply to the message. The prompt can include responsive audio such as, "Would you like to reply to 'Emily'?" and, in response, the user can provide a spoken utterance such as, for example, "Yes, please respond, 'Okay.'" Accordingly, the automobile automated assistant can receive the spoken utterance, via the automated assistant interface of the automobile, and employ a speech-to-text engine accessible to the automobile computer system to process the spoken utterance. The text derived from the spoken utterance can be embodied as content that can be part of a subsequent action intent request that is generated by the automobile automated assistant. The subsequent action intent request can be further generated to identify an action, such as sending a message, which should be performed by a target application (e.g., the third-party application).

In order to synchronize the subsequent action intent with the action intent request generated by the client device, the automobile automated assistant can generate the subsequent action intent using the same custom identifier as the action intent request generated by the client device. In this way, the client device can access the subsequent action intent request and/or determine that the subsequent action intent request was generated at the automobile computer system, and determine a correlation between the subsequent action intent request and the action intent request. In some implementations, the custom identifier can be used as at least one key for encrypting transmissions between the automated assistants.

When the subsequent action intent request has been generated at the automobile computer system, the client automated assistant can determine that the subsequent action intent request was generated, and generate a corresponding instance of the subsequent action intent request at the client device. Because the subsequent action intent request is directed at sending a message via the third-party application, the client automated assistant and/or client device can invoke the third-party application to send the message. In other words, because automobile computer system does not include an instance of the third-party application, the generation of the subsequent action intent request does not directly invoke any instance of the third-party application installed at the automobile computer system. Rather, in response to the client automated assistant acknowledging the generation of the subsequent action intent request and/or the corresponding instance of the subsequent action intent request being generated at the client device, the third-party application performs the sending of the responsive message.

In some implementations, in response to the user acknowledging the receipt of the message and/or in response the user indicating they would like to respond to the message, a pendency of the action intent request at the client device and the automobile computer system can be dismissed. For instance, in response to the user providing the spoken utterance, "Yes, please respond, 'Okay,'" the automobile automated assistant can cause a corresponding instance of the action intent request to be dismissed at the automobile computer system. Additionally, in response to the user providing the aforementioned spoken utterance, the client automated assistant can cause the action intent request to be dismissed at the client device. If a separate corresponding instance of the action intent request associated with the originally received message is available at, for example, a remote server device, the separate corresponding instance can also be dismissed.

The above description is provided as an overview of some implementations of the present disclosure. Further description of those implementations, and other implementations, are described in more detail below.

In some implementations, a method implemented by one or more processors is set forth as including operations such as identifying, by an automobile automated assistant, a first action intent request that is generated at a client device. The client device can be paired with an automobile computer system via a wireless communication channel, wherein the automobile computer system includes the automobile automated assistant. The operations can also include determining, in response to identifying the first action intent request, that the first action intent request identifies: a first requested action to be performed, content data to be accessed for performing the requested action, and an identifier that is associated with an application that at least partially caused the first action intent request to be available to the automobile computer system. The operations can also include causing, in furtherance of the first requested action to be performed, an automated assistant interface accessible to the automobile computer system to provide an output to a user of the automobile computer system, wherein the output is based on the content data of the first action intent request. The operations can further include determining, by the automobile automated assistant, that the user provided an input in response to the output provided at the automated assistant interface; and providing, in response to determining that the user provided the input, a second action intent request to the client device. The second action intent request can identify: a second requested action to be performed at the client device, other content data that is based on the input provided by the user, and the identifier. The operations can also include causing the second requested action to be performed at the client device according to the second action intent request. The second requested action can be performed by the application using the other content data, and the application can be identified by the client device using the identifier provided in the second action intent request.

In some implementations, the method can include providing, in response to determining that the user provided the input, a third action intent request to the client device, the third action intent request identifying the identifier and a third requested action, wherein, in response to the client device receiving the third action intent request, the third action intent request causes a pendency of the second action intent request at the client device to be dismissed. In some implementations, the method can include causing, in response to determining that the user provided the input, a dismissal of a separate pendency of a corresponding instance of the second action intent request, wherein the corresponding instance of the second action intent request is provided at the automobile computer system. In some implementations, the pendency of the second action intent request is indicated by a first automated assistant event handler accessible via the client device, and the separate pendency of the corresponding instance of the second action intent request is indicated by a second automated assistant event handler accessible via the automobile computer system.

In some implementations, the automobile computer system is void of an installed application that: (i) is provided by a third party who provided the application at the client device, and (ii) is at least partially correlated to the application at the client device. In some implementations, the automobile computer system is paired with a separate client device that includes another application that is provided by a different third party relative to the application at the client device, and the method further comprises: identifying, by the automobile automated assistant, a separate action intent request that is generated at the separate client device, the separate client device being paired with the automobile computer system. In some implementations, the separate action intent request includes another identifier generated by the separate client device, and the method further comprises: designating, based on a difference between the identifier and the other identifier, the first action intent request as a priority over the separate action intent request.

In other implementations, a method implemented by one or more processors is set forth as including operations such as connecting, using an automobile computer system, with a first client device via a wireless communication modality, the first client device comprising a client automated assistant, and the automobile computer system comprising an automobile automated assistant and an automobile sensor application, the automobile sensor application configured to monitor at least one sensor of the automobile computer system. The method can also include connecting, using an automobile computer system, with a second client device via the wireless communication modality, the second client device comprising another client automated assistant. The method can further include determining, by the automobile computer system, that a first action intent request was generated at the first client device by an application, wherein the application corresponds to a particular category of service and is provided by a first service provider. The method can also include determining, by the automobile computer system, that a second action intent request was generated at the second client device by another application, wherein the other application corresponds to the particular category of service and is provided by a second service provider. The method can further include determining, using the automobile computer system, that a third action intent request was generated at the automobile sensor application, wherein the third action intent request is generated based on sensor data from the sensor of the automobile computer system. The method can also include generating, by the automobile automated assistant, data indicating a pendency of each action intent request of the first action intent request, the second action intent request, and the third action intent request, wherein the data is stored at the automobile computer system. The method can further include causing, according to the generated data, one or more interfaces connected to the automobile computer system to provide a notification for each action intent request of the first action intent request, the second action intent request, and the third action intent request.

In some implementations, the method can include causing, in response to determining that the third action intent request was generated at the automobile sensor application, a corresponding instance of the third action intent request to be stored at the first client device. In some implementations, the method can include receiving a user input at the one or more interfaces connected to the automobile computer system; and causing, in response to receiving the user input, a pendency of the notification associated with the third action intent request to be dismissed at the automobile computer system and the corresponding instance of the third action intent request to be dismissed at the first client device. In some implementations, the particular category of service is a messaging service and the first service provider is different than the second service provider. In some implementations, the method can include processing, for each action intent request of the first action intent request and the second action intent request, content of each message embodied by each action intent request, wherein the processing of the content of each message is performed inattentive of whether each message was provided by a service provider of the first service provider and the second service provider. In some implementations, generating the data indicating the pendency of each action intent request includes: generating, by the automobile automated assistant, a corresponding instance of each action intent request of the first action intent request, the second action intent request, and the third action intent request.

In yet other implementations, a method implemented by one or more processors is set forth as including operations such as connecting, by a client device via a wireless modality, with an automobile computer system that is integral to a vehicle and includes an automobile automated assistant, wherein the client device includes a client automated assistant. The method can also include accessing, by the client device via the automobile computer system, an action intent request that was received by the automobile automated assistant from an application of the automobile computer system, wherein the application is in communication with a sensor of the vehicle and the action intent request is based at least on a signal from the sensor. The method can further include generating, by the client automated assistant and based on accessing the action intent request, a corresponding instance of the action intent request, wherein the client device includes one or more other action intent requests provided by one or more other applications at the client device. The method can also include disconnecting the client device from the automobile computer system, at least based on the client device becoming less proximate to the vehicle or the automobile computer system. The method can further include performing, by the client automated assistant subsequent to disconnecting from the automobile computer system, an action according to the corresponding instance of the action intent request, wherein performing the action includes providing, at an interface of the client device, content identified by the action intent request.

In some implementations, the client device is void of an installed application that: (i) is provided by a third party who provided the application at the automobile computer system, and (ii) is at least partially correlated to the application at the automobile computer system. In some implementations, determining a particular context, and performing is in response to determining the particular context. In some implementations, determining the particular context includes determining a location of the client device, and the method further comprises: determining that the content identified by the action intent request is associated with the location of the client device, wherein the action is performed in response to determining that the content identified by the action intent request is associated with the location of the client device. In some implementations, the method can include providing, based on the client automated assistant performing the action according to the corresponding instance of the action intent request, a request for the action intent request to be dismissed at the automobile computer system. In some implementations, the request is provided to a remote server device that is configured to communicate with the automobile computer system and cause the action intent request to be dismissed at the automobile computer system. In some implementations, the action intent request was generated in response to a user providing a spoken utterance to an automated assistant interface of the automobile computer system, and wherein the method further comprises: receiving, from the automobile computer system in response to the user providing the spoken utterance to the automated assistant interface, data corresponding to the spoken utterance; and providing, to the automobile computer system, responsive data based on the data received from the automobile computer system, wherein the action intent request is further based on the responsive data received by the automobile computer system.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
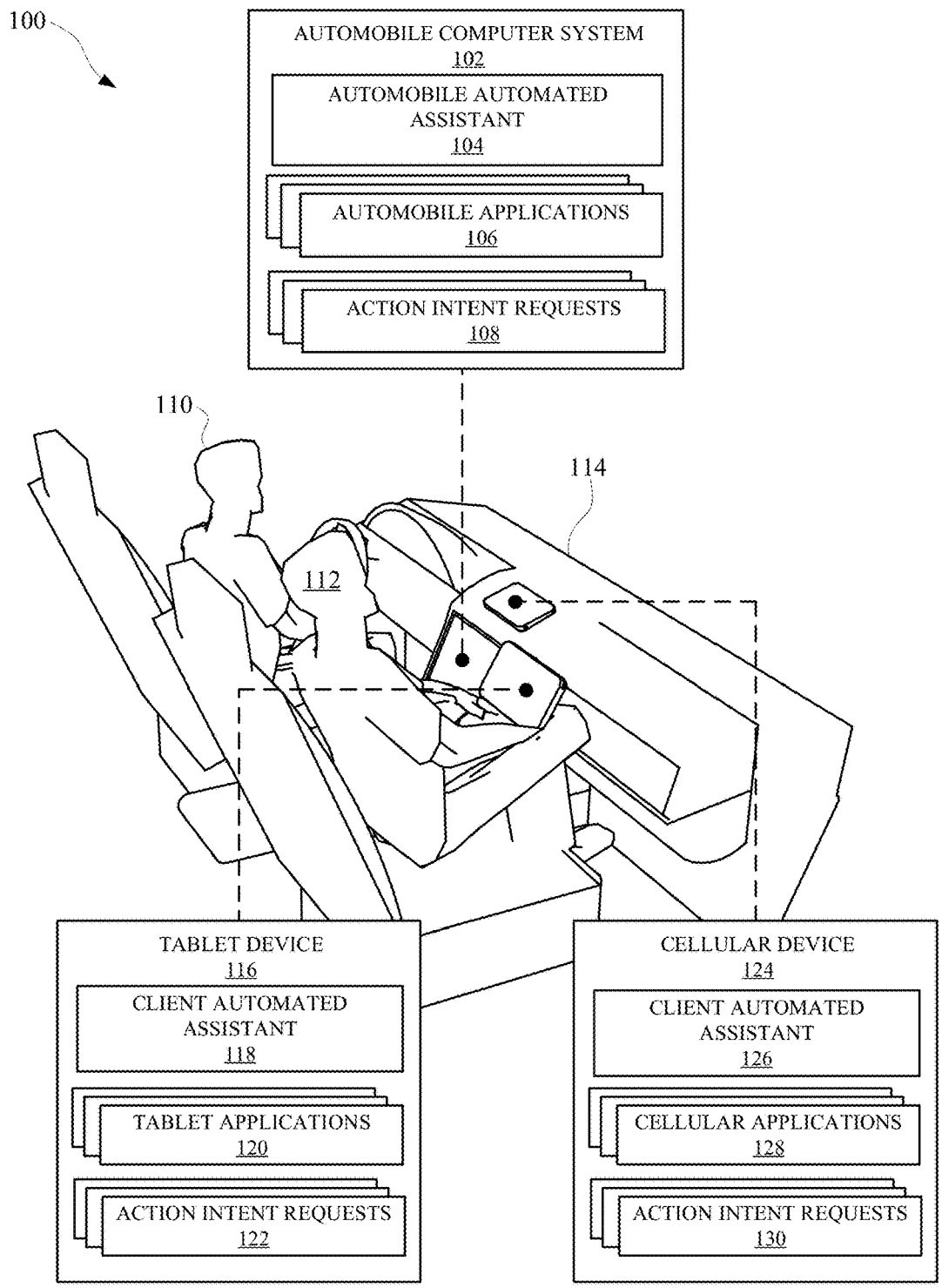
FIG. 1 illustrates a perspective view of a vehicle that can allow multiple different users to cause a vehicle automated assistant to interact with applications at each of their respective devices.

FIG. 1 illustrates a perspective view 100 of a vehicle 114 that can allow multiple different users to cause a vehicle automated assistant to interact with applications at each of their respective devices. When riding in a vehicle 114, a first user 110 and a second user 112 may bring different devices to interact with during their excursion in the vehicle 114. For instance, the first user 110 can bring a cellular device 124 (i.e., a client device) and the second user 112 can bring a tablet device 116 (i.e., a client device). The vehicle 114 can include an automobile computer system 102, which can provide the users with access to an automobile automated assistant 104. Each of the cellular device 124 and the tablet device 116 can include a client automated assistant 126 and a client automated assistant 118, respectively. Furthermore, the automobile automated assistant 104 can act as a primary automated assistant when each of the users bring their respective devices into the vehicle 114. In this way, each user does not necessarily have to pair their respective device exclusively to the automobile computer system 102. Furthermore, according to some implementations of the automobile automated assistant 104, the automobile computer system 102 does not necessarily need to have the same applications that are installed on each of the client devices. In this way, the automobile computer system 102 can make a more efficient use of memory, and, furthermore, with fewer installed applications, the automobile computer system 102 would not consume as much network bandwidth retrieving updates and communicating with servers. Such benefits can be realized, in part, through interactions between each respective automated assistant over a wireless communication modality available at the vehicle 114. Furthermore, similar benefits can be realized at servers that would otherwise use phone numbers for authenticating and delivering each message.

For example, each user can enter the vehicle 114 with their respective client devices, and each client device can include and/or generate action intent requests. For instance, the tablet device 116 can include one or more tablet applications 120, capable of generating action intent requests 122, and the cellular device 124 can include one or more cellular applications 128 capable of generating action intent requests 130. The tablet applications 120 and/or the cellular applications 128 can be third-party applications and/or applications that are provided or developed by an entity that is different than an entity that provided or developed one or more instances of the automated assistant.

When the first user 110 and the second user 112 initially enter their vehicle 114 with their respective client devices, each client device can determine that the vehicle 114 includes an automobile computer system 102 capable of communicating over a wireless modality. Furthermore, each client device can determine that the automobile computer system 102 includes an automobile automated assistant 104. Specifically, the client automated assistant 118 and the client automated assistant 126 can determine that the automobile computer system 102 includes the automobile automated assistant 104. In response to making the determination, the client automated assistant 118 can cause corresponding instances of the action intent requests 122 to be generated at the automobile computer system 102, and the client automated assistant 126 can cause corresponding instances of the action intent requests 122, 130 to be generated at the automobile computer system 102. As a result, the automobile automated assistant 104 can cause any actions associated with the corresponding instances of the action intent requests (stored locally as action intent requests 108) to be furthered via interactions between one or more users and the automobile automated assistant 104. Moreover, the automobile automated assistant 104 can further the actions identified by the action intent requests 108 despite the automobile computer system 102 including automobile applications 106, which may not be equivalent to, or otherwise be an instance of, any one application of the tablet applications 120 and/or the cellular applications 128. For instance, the automobile applications 106 can include a maintenance application that provides the automobile automated assistant 104 with information about the vehicle 114. The information can be shared with one or more both of the tablet device 116 and cellular device 124, despite either device not including an equivalent, or instance of, the maintenance application. This can allow each user to not necessarily direct their attention to their devices during their excursion, but, rather, rely on the automobile automated assistant 104 to relay their respective notifications and/or further any particular action.

Figure 2:
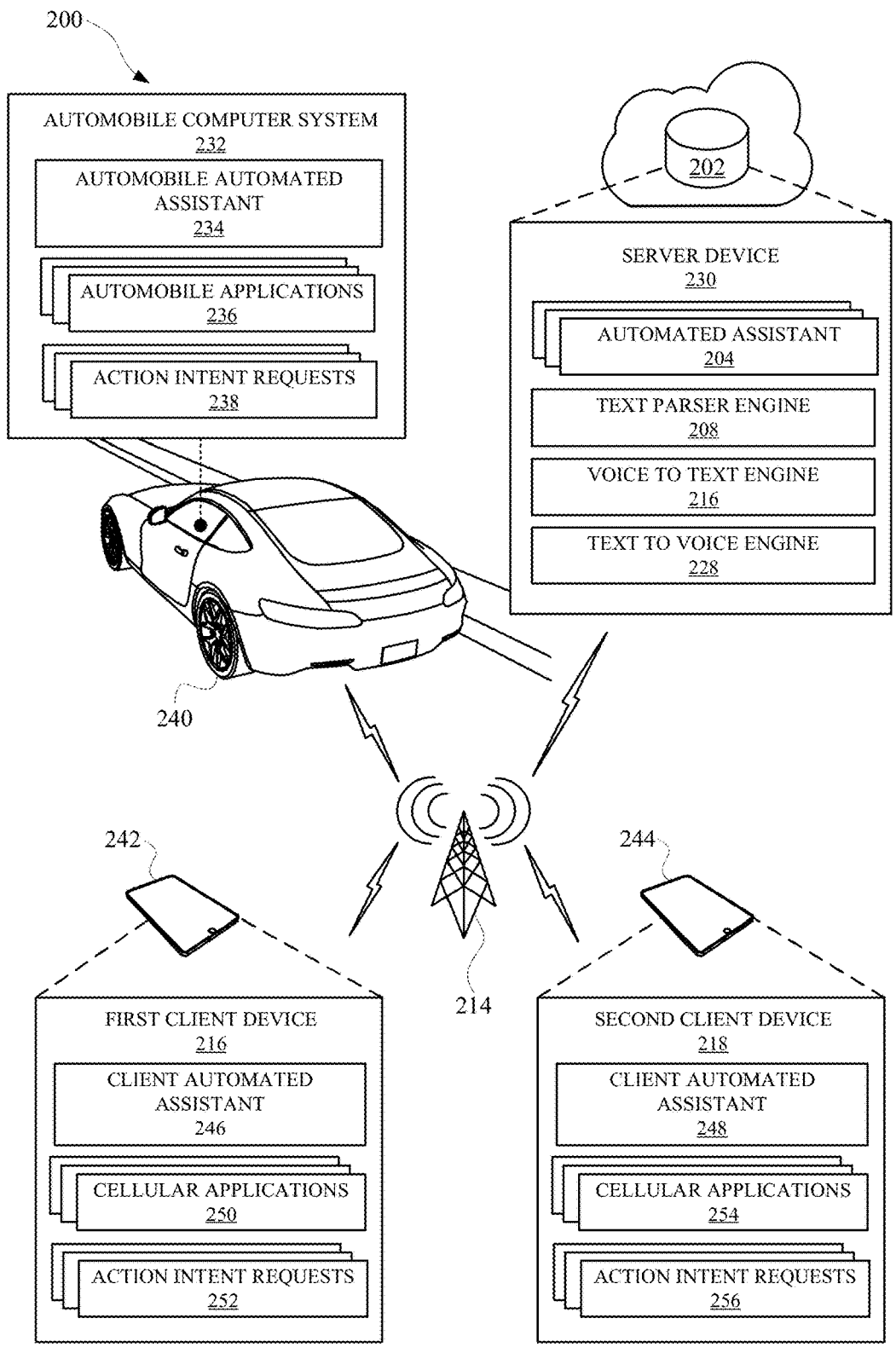
FIG. 2 illustrates a system for providing an automated assistant that is capable of interacting with other automated assistants in order to further actions requested by third party applications.

FIG. 2 illustrates a system 200 for providing an automated assistant that is capable of interacting with other automated assistants in order to further actions requested by third party applications. An automated assistant 204 can operate as part of an assistant application that is provided at one or more computing devices, such as a first client device 216 (e.g., a cellular phone 242), a second client device 218 (e.g., a tablet device 244), and/or a remote computing device 202, such as a server device 230. A user can interact with the automated assistant(s) 204 via an assistant interface (e.g., inside a vehicle 240), which can be a microphone, a camera, a touch screen display, a user interface, and/or any other apparatus capable of providing an interface between a user and an application. For instance, a user can initialize the automated assistant 204 by providing a verbal, textual, and/or a graphical input to the assistant interface to cause the automated assistant 204 to perform a function (e.g., provide data, control a peripheral device, access an agent, etc.). The first client device 216 can include a display device, which can be a display panel that includes a touch interface for receiving touch inputs and/or gestures for allowing a user to cellular applications 250 of the first client device 216 via the touch interface. The second client device 218 can also include a display device, which can be a display panel that includes a touch interface for receiving touch inputs and/or gestures for allowing a user to control cellular applications 254 of the second client device 218 via the touch interface. In some implementations, the second client device 218 can lack a display device, thereby providing an audible user interface output, without providing a graphical user interface output. Furthermore, the second client device 218 can provide a user interface, such as a microphone, for receiving spoken natural language inputs from a user.

The first client device 216 and the second client device 218 can be in communication with the remote computing device 202 over a network 214, such as the internet. The first client device 216 and the second client device 218 can offload computational tasks to the remote computing device 202 in order to conserve computational resources at each of the first client device 216 and the second client device 218. For instance, the remote computing device 202 can host the automated assistant 204, and the first client device 216 and/or the second client device 218 can transmit inputs received at one or more assistant interfaces to the remote computing device 202. However, in some implementations, the automated assistant 204 can be hosted at the first client device 216 and/or the second client device 218. In various implementations, all or less than all aspects of the automated assistant 204 can be implemented on the first client device 216 and/or the second client device 218. In some of those implementations, aspects of the automated assistant 204 are implemented via a local assistant application of the first client device 216 or the second client device 218 and interface with the remote computing device 202 that implements other aspects of the automated assistant 204. The remote computing device 202 can optionally serve a plurality of users and their associated assistant applications via multiple threads. In some implementations where all or less than all aspects of the automated assistant 204 are implemented via a client automated assistant 226 of the first client device 216 or a client automated assistant 226 of the second client device 218, the client automated assistant can be an application that is separate from an operating system of the first client device 216 and/or the second client device 218 (e.g., installed "on top" of the operating system)—or can alternatively be implemented directly by the operating system of the first client device 216 or the second client device 218 (e.g., considered an application of, but integral with, the operating system).

In some implementations, the remote computing device 202 can include a voice to text engine 216 that can process audio data received at an assistant interface to identify the text embodied in the audio data. The process for converting the audio data to text can include a speech recognition algorithm, which can employ neural networks, word2vec algorithms, and/or statistical models for identifying groups of audio data corresponding to words or phrases. The text converted from the audio data can parsed by a text parser engine 208 and made available to the automated assistant 204 as textual data that can be used to generate and/or identify command phrases from the user and/or a third party application.

In some implementations, the remote computing device 202 can include a text to voice engine 228 for converting textual data into audio data. For instance, in response to the automobile automated assistant 234 identifying a pending action intent request 238 associated with a received message, the automobile automated assistant 234 can cause content corresponding to the message to be transmitted to the text to voice engine 228. In response to receiving the content, the text to voice engine 228 can convert the content into audio data, which can be transmitted back to the automobile automated assistant 234. The automobile automated assistant 234 can then cause the audio data to be output as an audio output from an audio interface (e.g., speaker(s)). Text can be converted to audio using a neural network(s), statistical model(s), and/or any other apparatus or module through which textual data can be converted to audio (e.g., audio corresponding natural language output). In some implementations, each of the voice to text engine 216, the text to voice engine 228, and/or the text parser engine 208 can be located at one or more client-side devices, such as the automobile computer system 232, the first client device 216, and/or the second client device 218. In this way, a respective automated assistant would not necessarily have to transmit data to a remote server for processing, but could rather process the data locally in order to generate and/or interpret particular data for a user.

In some implementations, one or more of the engines, applications, and/or operations of the server device 230 can be provided and/or executed at the automobile computer system 232, the first client device 216, and/or the second client device 218. For instance, in some implementations, the automobile computer system 232 can include the text to voice engine 228 and/or the voice to text engine 216. Furthermore, in some implementations, any content received at the automobile automated assistant 234, the client automated assistant 246, and/or the client automated assistant 248 can be transmitted to the server device 230 when there is a connection between a device that hosts the respective assistant and the server device 230. Alternatively, or additionally, when no connection is available between a respective device or system, and the server device 230, any content received can be exclusively processed at the respective device and/or shared with other local device in order that the content can be processed in parallel. For instance, when the content corresponds to a message received at the second client device 218 and transmitted to the automobile computer system 232, the automobile computer system 232 can employ a local text to voice engine in order to generate audio that can be provided to a user while riding in the vehicle.

In some implementations, each device or system that include one or more applications can also include one or more corresponding action intent generation engines. An action intent generation engine can be controlled by an application in order to cause certain actions to be performed by the application, another application, and/or any other module accessible to the application. For instance, the application can be a messaging application and the messaging application can receive an incoming message. In response to receiving the incoming message, the action intent generation engine of the messaging application can generate an action intent for providing a notification to the user via an automated assistant. The action intent can identify the action to be performed (e.g., providing a notification), content of the received message, a custom identifier associated with the message, and/or any other data that can be associated with the message.

In some implementations, each action intent generation engine and/or application can be associated with a declaration and/or manifest file indicating types of actions capable of being performed by the application. For instance, a messaging application can include a manifest file indicating that the messaging application is capable of at least receiving messages, notifying the user of messages, and/or responding to messages. An operating system and/or automated assistant can access each manifest file on one or more devices in order to determine whether particular applications can handle particular actions. In this way, for example, action intents generated at the automobile computer system 232 can be provided to either the first client device 216 or the second client device 218 based on whether a particular manifest file at one of the devices indicates there is an application at the device that can handle the action intents. If more than one application can handle a particular action intent, the originating device and/or a separate device, can prompt the user to select the device to handle the particular action intent (e.g., via a graphical user interface).

In some implementations, each action intent generation engine can also generate and/or filter action intents according to a customer identifier that is associated with each action intent of the action intents. For instance, when an action intent generation engine generates an action intent at the direction of an application, the action intent generation engine can also generate a custom identifier. The custom identifier can be generated based on an identifier for content to be used in performing the action, an identifier representing the originating application, an identifier for the recipient, an identifier for the originating user, an identifier for a context of the action intent, and/or any other information that can be used as a basis from which to generate an identifier.

Each automated assistant and/or operating system can be configured to parse an action intent to identify content data, an intended action to be performed, and/or a custom identifier. In some implementations, the automated assistant can process each action intent seemingly agnostic with respect to the originating application. For instance, despite the first client device 216 and the second client device 218 including different messaging applications, the automobile computer system 232 can retrieve action intent requests from either messaging applications and read the message to the user via an automated assistant interface of the automobile computer system 232. For example, a message application at the first client device 216 can generate an action intent request 252, and when the user enters the vehicle 240, the pending action intent request can be accessed by the automobile automated assistant 234. The automobile automated assistant 234 can then generate a corresponding instance of the pending action intent request. Because the content data provided by the action intent request can include data such as "Hey, have you left yet?," the automobile automated assistant 234 can determine that content data corresponds to an incoming message. Therefore, because many different messaging applications will generate action intents in a similar manner, the automobile automated assistant 234 can act to present and respond to such action intents in a universal manner, and/or relatively agnostic to the entity that provided the corresponding messaging application (e.g., a first service provider, a second service provider, etc.).

In some implementations, computational resources can be preserved by employing a voice to text engine to process audio data corresponding to multiple spoken utterances, rather than performing multiple turns between a speech recognition engine and the automated assistant. For instance, a principal automated assistant can receive a command from a user such as, "Send a message to Robert." In response, the principal automated assistant can have a preconfigured response such as, "Ok, which messaging application would you like to use? Your first application, second application, or your third application?" The user can provide a response, such as "My first application," and then dictate a message such as, "How's your day been?" In some implementations, the automated assistant can confirm the messaging application to use and prompt the user whether they would like to send or change the message (e.g., "Ok, should I send the message or change the message?"). At this time, the user may request that a different messaging application be selected. For instance, the user can reply, "Please send with the second messaging application instead of the first messaging application." In response, the automated assistant can then cause the message to be transmitted by the second messaging application. This can reduce a number of turns between the user and the automated assistant, given that the processing of messages would not need to be tailored for each individual messaging application.

In some implementations, each automated assistant (e.g., the automobile automated assistant 234) can access and/or manage an event handler that includes data corresponding to pending action intent requests. As actions in furtherance of the pending action intent requests are performed, each event handler for each automated assistant can be updated. In some implementations, an event handler can include pending action intent request that correspond to the same event. For instance, multiple different actions can be associated with a received message. Therefore, when a user receives a text message at their first client device 216, a corresponding messaging application can generate multiple action intent requests for handling the received text message. When the first client device 216 pairs with the automobile computer system 232 over a wireless modality, such as, but not limited to Bluetooth, Wi-Fi, LTE, etc., the automobile automated assistant 234 can generate corresponding instances of the multiple action intent requests. The corresponding instances of the multiple action intent requests can be managed by an event handler of the automobile automated assistant 234, and can include some amount of data that associates the corresponding instances of the multiple action intent requests with the text message received at the first client device 216. For example, an action intent request identified by the event handler of the automobile automated assistant 234 can correspond to an action to notify the user of the text message and prompt the user regarding whether they would like to respond. The automobile automated assistant 234 can execute both actions related to the received text message, without having direct local access to the messaging application that is installed at the first client device 216.

Figure 3A:
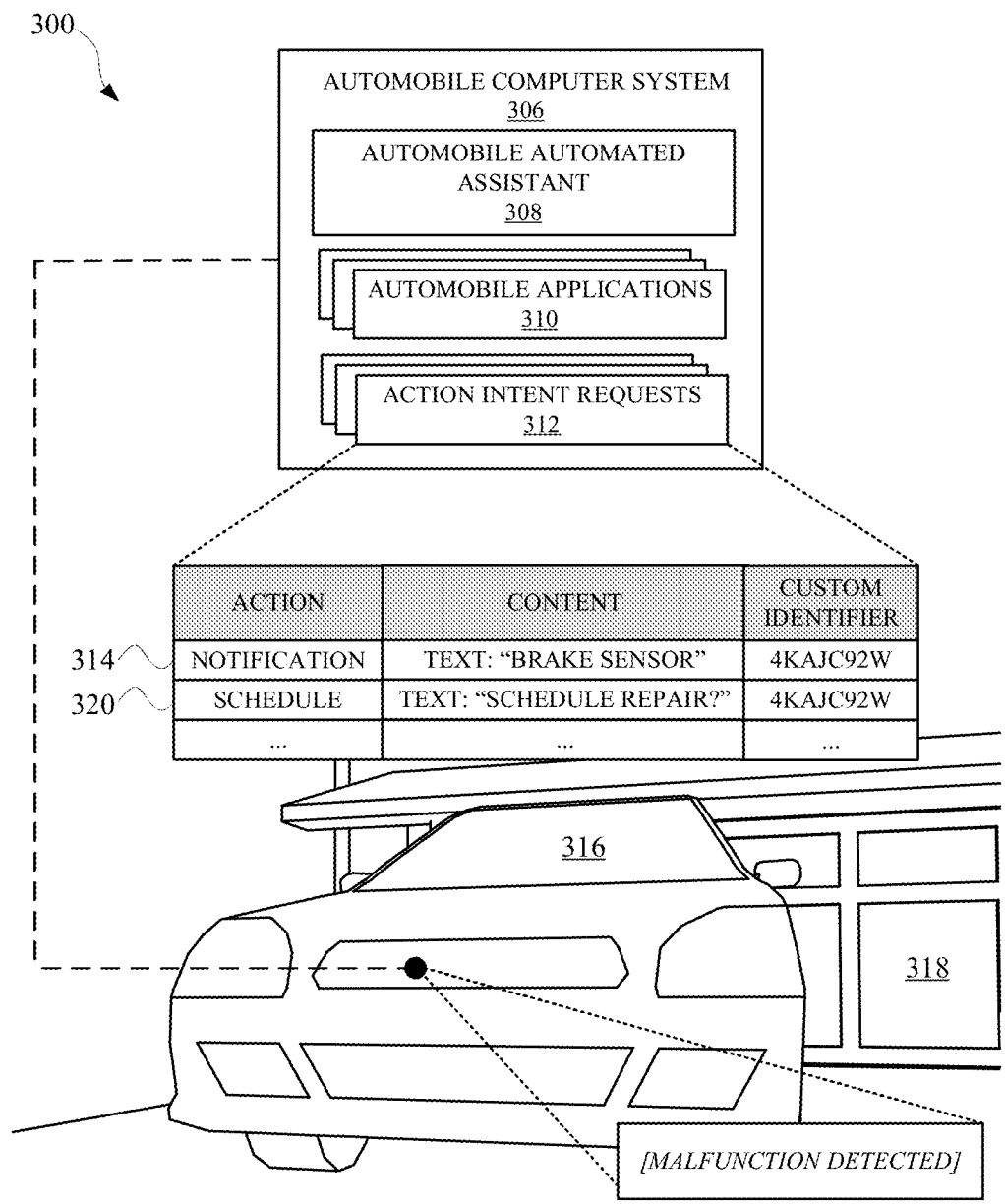
FIGS. 3A, 3B, and 3C illustrate perspective views of a scenario where client automated assistant of a portable computing device can act as a primary or principal automated assistant for multiple instances of the automated assistant.
Figure 3B:
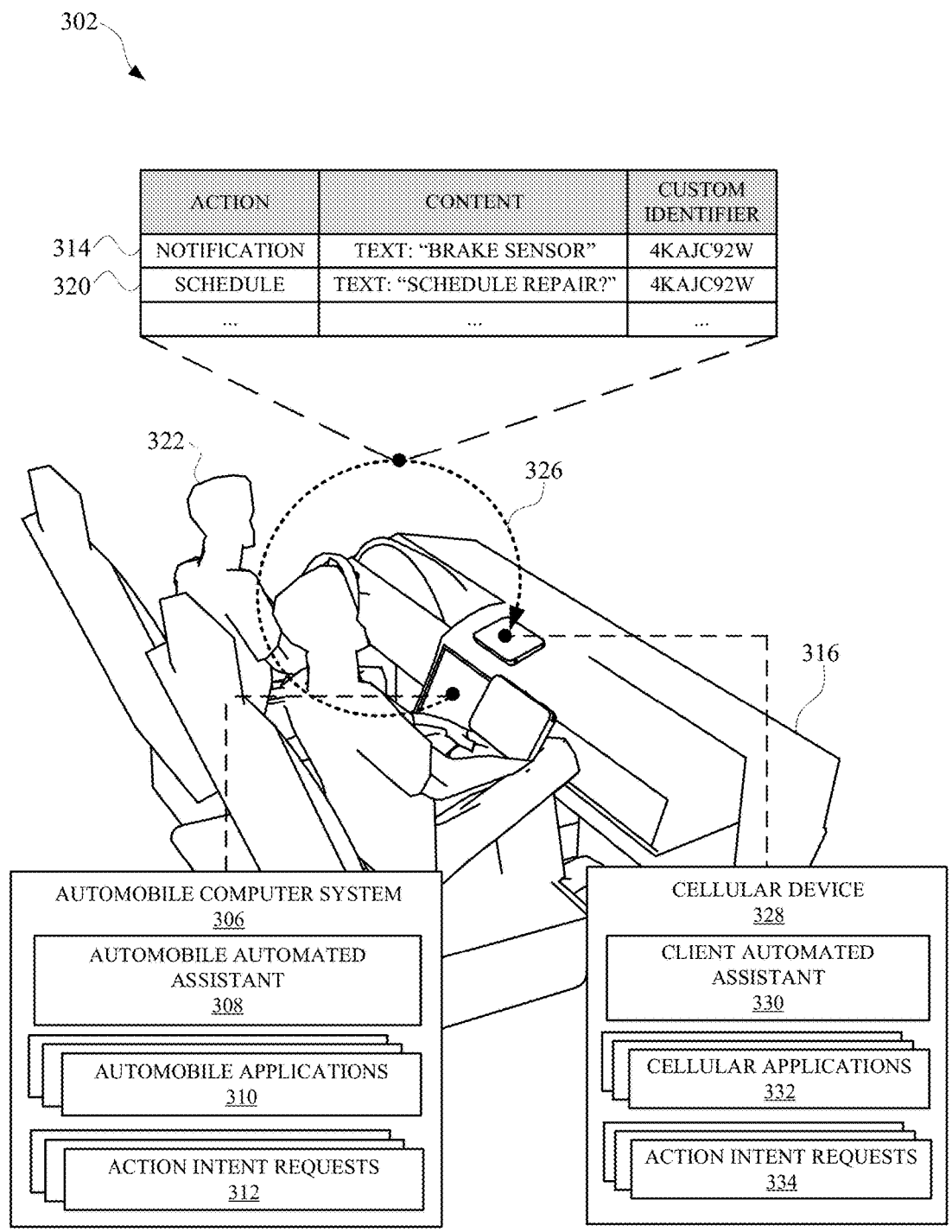
Figure 3C:
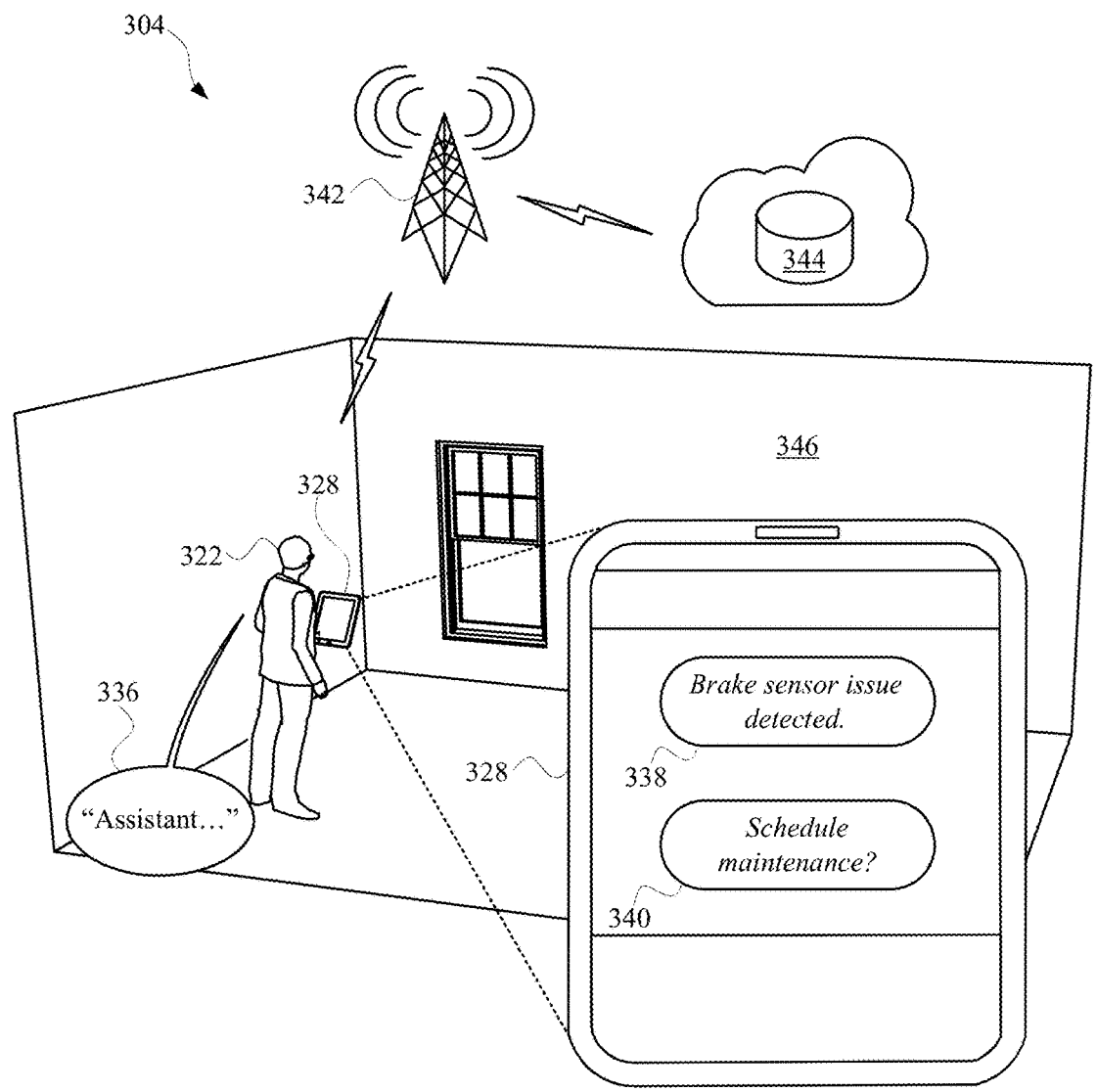

FIGS. 3A, 3B, and 3C illustrate perspective views 300, 302, and 304 of a scenario where client automated assistant of a portable computing device can act as a primary automated assistant for multiple instances of the automated assistant. For instance, while a user is in their home 318, malfunction can be detected at an automobile 316 that is associated with the user. The issue can be, for example, that a rodent has chewed through a cable, such as a wire that connects to a brake sensor, of the automobile 316 at night. Although an automobile computer system 306 of the automobile 316 can be operating in a standby mode, an automobile automated assistant 308 can be responsive to the issue, and generate one or more action intent requests 312 associated with the issue. Specifically, the automobile automated assistant 308 can generate an action intent request 314 for displaying an automobile issue notification (e.g., "brake sensor") to the user, and another action intent request 320 for prompting the user to schedule maintenance (e.g., "schedule repair?") to resolve the issue. Each action intent request can be generated with the same custom identifier (e.g., "4KAJC92W"), which can be associated with the originating issue. Furthermore, each action intent request can identify an action to be performed (e.g., "notification," and "schedule").

FIG. 3B illustrates a perspective view 302 of user 322 that has entered the automobile 316 with their cellular device 328, which also includes an instance of the automated assistant, as the client automated assistant 328. In some implementations, the automobile computer system 306 can include automobile applications 310 that are not installed directly to the cellular device 328. Furthermore, in some implementations, the cellular device 328 can include cellular applications 332 that are not installed directly to the automobile computer system 306. Regardless, action intent requests can be transmitted between the automobile computer system 306 and the cellular device 328 over a wireless modality, and can be parsed by a respective automated assistant.

For instance, the action intent requests 314 and 320 can be generated by a maintenance application of the automobile applications 310 and accessed by the automobile automated assistant 308. When the user 322 enters the vehicle with their cellular device 328, the automobile computer system 306 and the cellular device 328 can perform a handshake, in order to ensure that a secure communications channel 326 is provided between them. When a communications channel 326 has been established, the client automated assistant 330 can identify the pending action intent requests 312 that are available at the automobile computer system 306. Furthermore, the automobile computer system 306 can identify any action intent requests 334 that are available at the cellular device 328. When the client automated assistant 330 determines that the action intent requests 314 and 320 do not have any corresponding instances at the cellular device 328, the client automated assistant 330 can cause instances of the action intent requests 314 and 320 to be available at the cellular device 328. The instances of the action intent requests 314 and 320 at the cellular device 328 can include the same custom identifiers from the automobile computer system 306, thereby allowing updates for a particular event (e.g., an issue with the brake sensor detected) to be compiled over time.

FIG. 3C illustrates a perspective view 304 of the user 322 in their home 346 subsequent to the instance of the action intent requests 314 and 320 being generated. Specifically, the user 322 can enter their home 346 and, in response, the client automated assistant can attempt to complete the actions indicated by the action intent requests 314 and 320. For instance, the client automated assistant can cause a display interface of the cellular device 328 to present selectable elements 338 and 340, which can correspond to the action intent requests 314 and 320. Alternatively, the user 322 can provide a spoken utterance 336 to an interface (e.g., a microphone) of the cellular device 328 in order to cause the client automated assistant to present any notifications associated with any pending action intent requests. For instance, the user 322 can provide a spoken utterance 336 such as, "Assistant, show me pending notifications." In response, the client automated assistant cause a nearby display panel to present notifications associated with the action intent requests to the user 322.

If the user 322 selects either of the selectable elements 338 and 340, a pendency of the action intent requests 314 and 320 can be dismissed at each device that included an instance of the action intent requests 314 and 320. For instance, instances of the action intent requests 314 and 320 can be dismissed at the automobile computer system 306 and the cellular device 328. In some implementations, the action intent requests 314 and 320 can be dismissed at the automobile computer system, when, in response to the user 322 selecting the selectable elements 338 and 340, data can be transmitted over a network 342 to a remote device 344. The remote device 344 can thereafter be accessed by the automobile computer system 306, which can update an event handler of the automobile computer system 306 according to the data at the remote device 344.

Figure 4A:
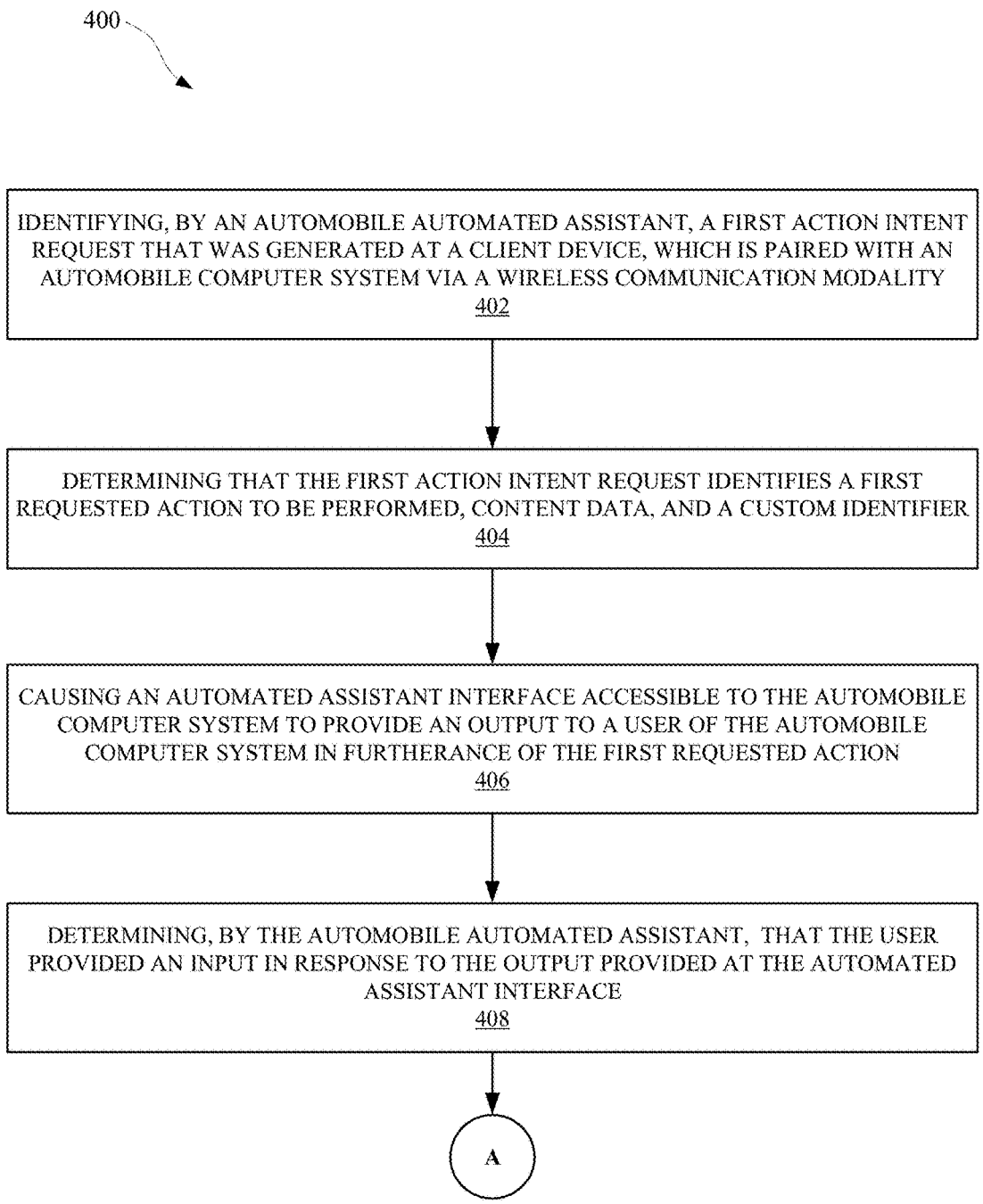
FIGS. 4A and 4B illustrate methods for handling action intent requests generated when a client device is in communication with an automobile computer system.
Figure 4B:
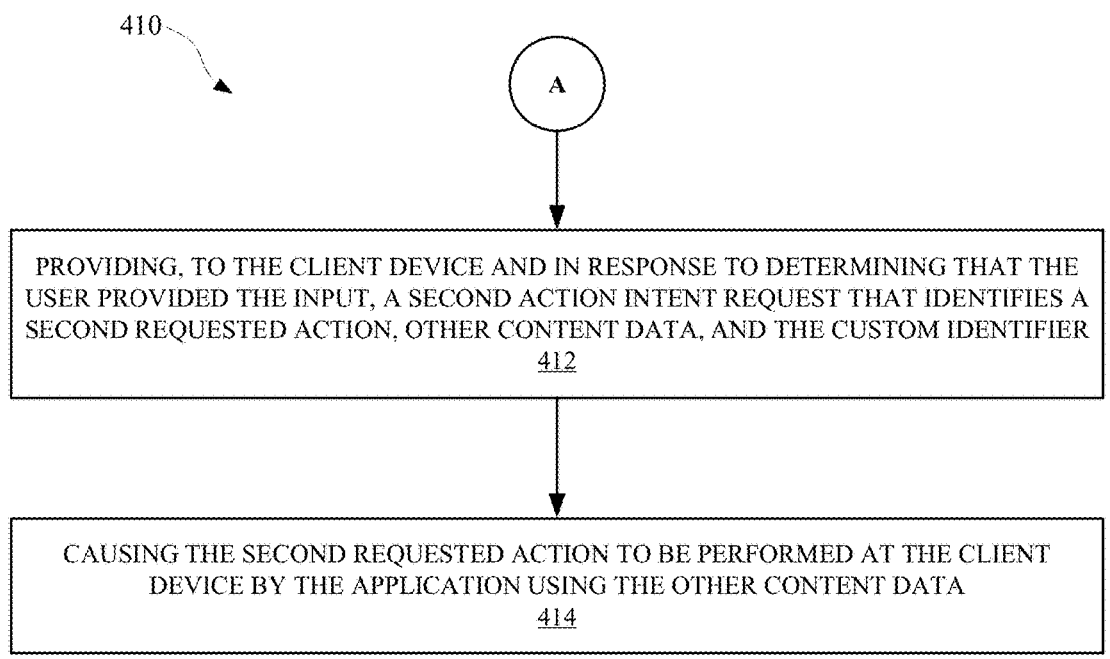

FIGS. 4A and 4B illustrate methods 400 and 410 for handling action intent requests generated when a client device is in communication with an automobile computer system. The methods 400 and 410 can be performed by one or more of a computing device, application, and/or any other apparatus or module capable of communicating over a wireless connection. The method 400 can include an operation 402 of identifying, by an automobile automated assistant, a first action intent request that was generated at a client device. The client device can be paired with an automobile computer system via wireless communication modality. The first action intent request can be generated by an application at the client device, for instance, in response to an operation (e.g., receiving a message) performed at the application. In some implementations, the automobile computer system can be void of a corresponding instance of the application of the client device. Specifically, the automobile computer system can be void of a separate application that is provided by a third party that provided the application at the client device, and/or is at least partially correlated to the application at the client device. For instance, the application can be a text messaging application, and the automobile computer system can be void of the text messaging application.

The method 400 can further include an operation 404 of determining that the first action intent request identifies a first requested action to be performed, content data, and a custom identifier. The first requested action can be a request to notify a user that an incoming message was received at a messaging application installed at the client device. The content data can identify some or all of the text provided in the received text message (e.g., "Are you on the way?"). Furthermore, the custom identifier can be a string of data that can provide a correspondence between the received text message and the first action intent request, in order that any further action taken with the first action intent request can be subsequently associated with the received text message.

The method 400 can also include an operation 406 of causing an automated assistant interface, accessible to the automobile computer system, to provide an output to a user of the automobile computer system. For instance, the output can be provided in response to the automobile automated assistant determining that the first action intent request corresponds to an action of providing a notification. The notification can be presented at the automated assistant interface, which can be a display panel that is connected to the automobile computer system. Alternatively, the automated assistant interface can be a speaker that is connected to the automobile computer system, and the notification can be an audible audio output such as, "Matthew sent you a message that says, 'Are you on the way?'"

The method 400 can further include an operation 408 of determining, by the automobile automated assistant, that the user provided an input in response to the output provided at the automated assistant interface. For instance, the user can provide a responsive spoken utterance such as, "Please response, 'Yes, I'm on the way,'" to an automated assistant interface (e.g., a microphone) of the automobile. The automobile automated assistant can receive audio data corresponding to the responsive spoken utterance, either cause the audio data to be processed locally or transmit the audio data to a separate device for processing. By processing the audio data, the automobile automated assistant can determine whether the user has acknowledged the notification of the text message, and any other action that the user would like to perform. For example, in response to receiving the responsive spoken utterance, the automobile automated assistant can cause a second action intent request to be generated.

The method 400 can proceed to method 410, as indicated by a continuation element "A," encircled at FIGS. 4A and 4B. The method 410 can include an operation 412 of providing, to the client device and in response to determining that the user provided the input, the second action intent request. The second action intent request can identify a second requested action, other content data, and/or the custom identifier associated with the first action intent request. The second requested action can be request to respond to the text message that was received at the messaging application. The other content data can include text that is based on the responsive spoken utterance (e.g., "content-data='text:Yes, I'm on the way"), and the custom identifier can be the same custom identifier from the first action intent request.

The method 410 can further include an operation 414 of causing the second requested action to be performed at the client device by the application using the other content data. For instance, when the action includes transmitting a responsive message, the client device can using the content data in order to generate the responsive message and transmit the responsive message to the person who initially sent the text message to the client device. In order to identify the text message and/or application that the second action intent request corresponds, an instance of the automated assistant at the client device can compare the custom identifier to the custom identifier provided with the first action intent request. Alternatively, or additionally, the automated assistant can identify the messaging application based on whether the messaging application can perform the second requested action, as indicated by a manifest file of the messaging application. The automated assistant at the client device can then cause the messaging application to perform the second requested action, and thereby send the text message corresponding to the responsive spoken utterance.

Figure 5:
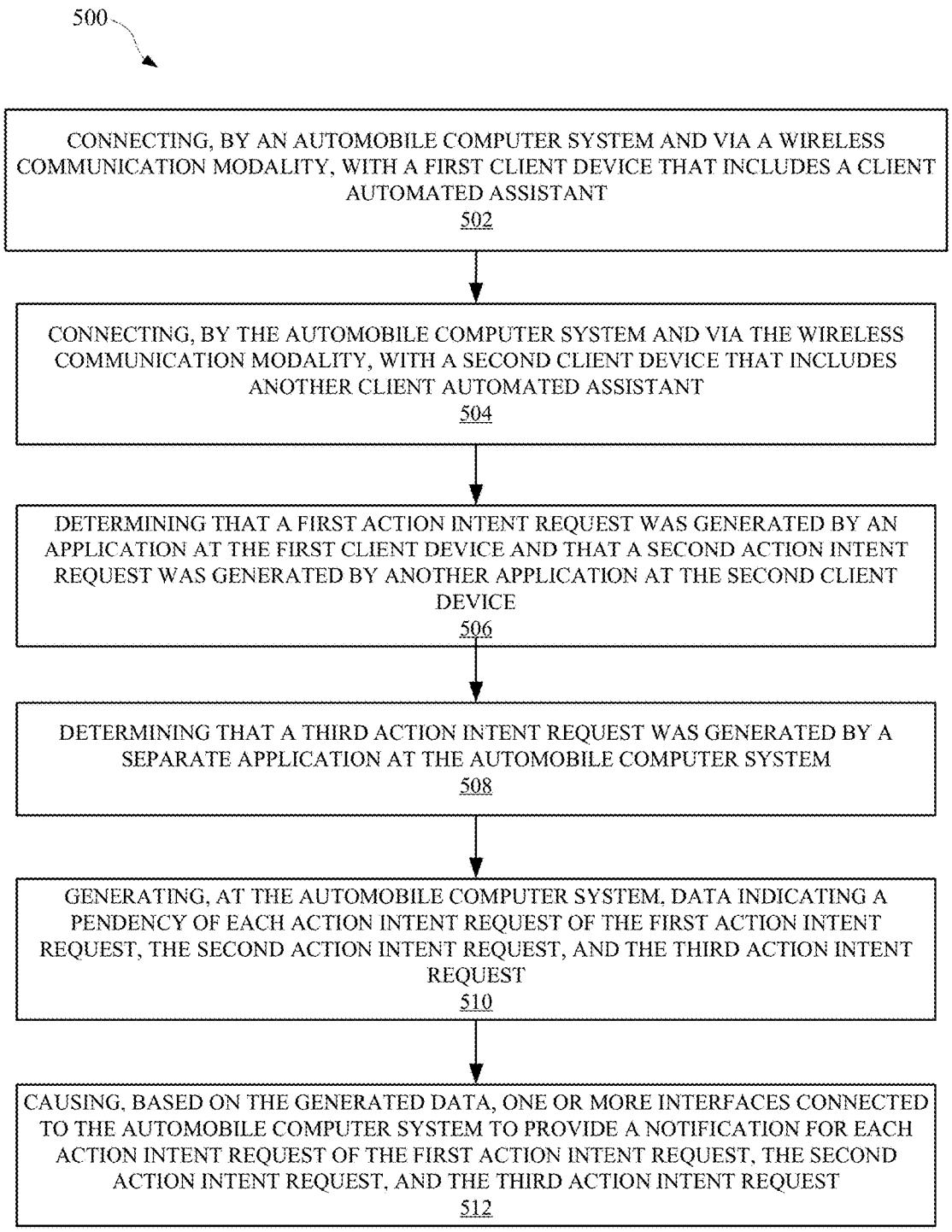
FIG. 5 illustrates a method of providing an output from an interface according to multiple different action intent requests provided from different instances of an automated assistant.

FIG. 5 illustrates a method 500 of providing an output from an interface according to multiple different action intent requests provided from different instances of an automated assistant. The method 500 can be performed by one or more of a computing device, an application, and/or any other apparatus or module capable of interacting with an automated assistant. The method 500 can include an operation 502 of connecting, by an automobile computer system and via a wireless communication modality, with a first client device that includes a client automated assistant. The first client device can be, for example, a portable computing device such as a cell phone or tablet computer, and the automobile computer system can be a computing device that is integral to a vehicle capable of delivering multiple passengers. Furthermore, the wireless modality can be one or more wireless communication protocols such as Bluetooth, Wi-Fi, LTE, and/or any other modality through which multiple computing devices can interact.

The method 500 can further include an operation 504 of connecting, by the automobile computer system, and via the wireless communication modality, with a second client device that includes another client automated assistant. The other client automated assistant can be provided the same or different entity as the client automated assistant, and the second client device can be the same or different type of client device as the first client device. For instance, the first client device can be owned by a driver of the automobile and the second client device can be owned by a passenger of the automobile. Furthermore, operation 502 and operation 504 can be performed when the driver and the passenger of the automobile enter the automobile. In this way, an automobile automated assistant will be able to interact with the client automated assistant and the other client automated assistant when the driver and the passenger are in the automobile.

The method 500 can further include an operation 506 of determining that a first action intent request was generated by an application at the first client device and that a second action intent request was generated by another application at the second client device. The first action intent request can correspond to a request for a notification to be presented to the driver, and the notification can provide information about a message that was received at the first client device. The second action intent request can correspond to a different request for a different notification to be presented to the passenger. The other notification can provide different information about a different message that was received at the second client device.

The method 500 can also include an operation 508 of determining that a third action intent request was generated by a separate application at the automobile computer system. The separate application can be, for example, a maintenance application that monitors one or more sensors of the automobile. Furthermore, the first client device and the second client device can be void of any corresponding instance of the maintenance application. In some implementations, the third action intent request can correspond to a request for a notification to be provided to the driver regarding a condition of the car, such as an oil change being overdue and/or brake fluid needing to be replaced.

The method 500 can also include an operation 510 of generating, at the automobile computer system, data indicating a pendency of each action intent request of the first action intent request, the second action intent request, and the third action intent request. The data can be embodied as or accessible to an event handler engine capable of arranging data corresponding to various different action intent requests from various different applications and/or devices. For instance, the data can identify a priority of each of the action intent requests. A priority for an action intent request can be based on, for example, whether the action intent request was generated at a device that includes a primary automated assistant (i.e., an automated assistant that at least more than one other automated assistants are communicating with). For instance, the primary automated assistant, when the driver and the passenger are riding in the automobile, can be the automobile automated assistant because it is installed at the automobile computer system of the automobile. A next priority can be given to action intent requests that are provided by a device that is associated with the driver of the vehicle, such as the first client device. Thereafter, other priorities can be assigned to action intent requests associated with passengers of the automobile.

The method 500 can further include an operation 512 of causing, based on the generated data, one or more interfaces connected to the automobile computer system to provide a notification for each action intent request of the first action intent request, the second action intent request, and/or the third action intent request. In some implementations, the automobile computer system can include an interface, such as a display panel, at which graphical elements are presented, and one or more of the graphical elements can correspond to either of the action intent requests. Furthermore, the display panel can be a touch interface through which a user can select a graphical element in order to acknowledge a notification and cause another action intent request to be generated at the automobile computer system.

Figure 6:
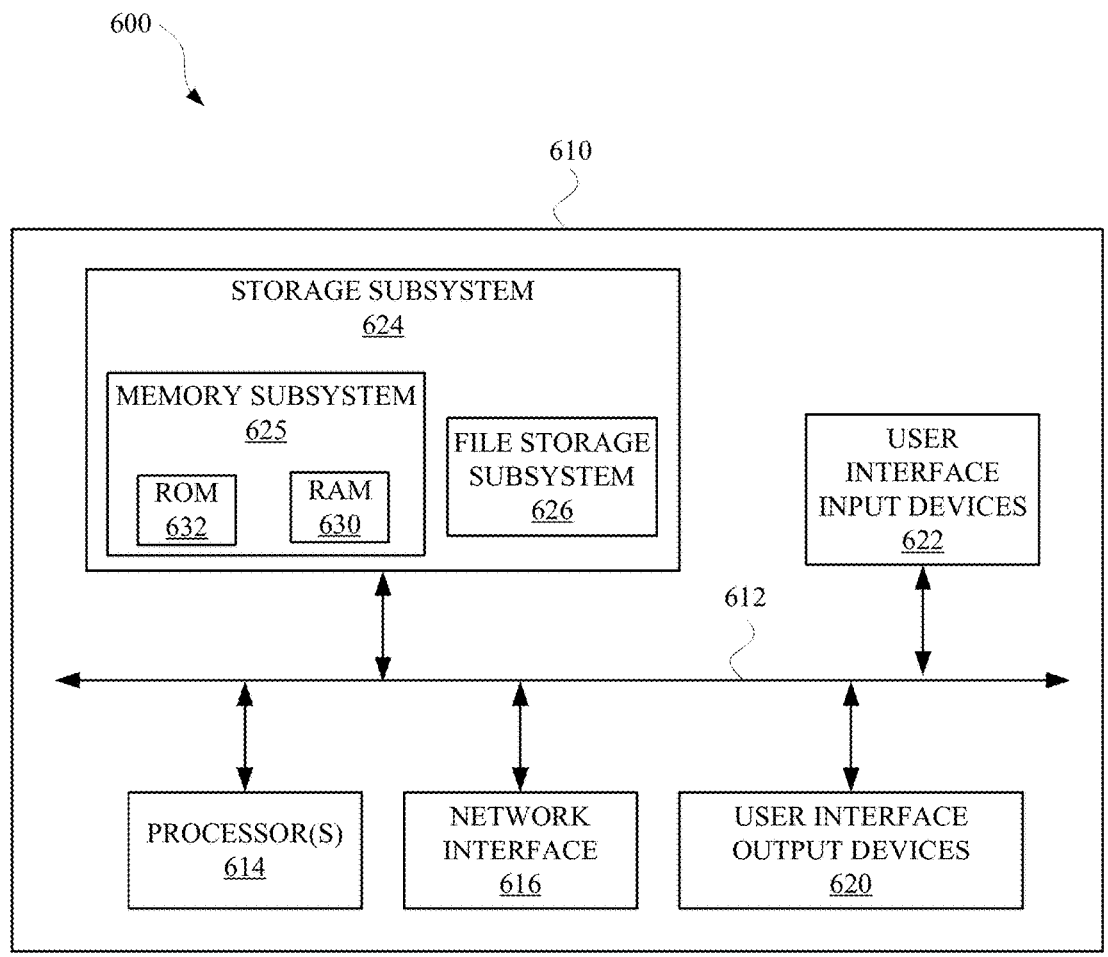
FIG. 6 is a block diagram of an example computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 400, method 500, and/or to implement one or more of an automobile automated assistant, an automobile computer system, a client automated assistant, a client device, a remote device, a server device, a vehicle, and/or any other module or apparatus discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:

identifying, by an automobile automated assistant, a first action intent request that is generated at a client device, the client device and a separate client device being paired with an automobile computer system via a wireless communication channel, wherein the automobile computer system includes the automobile automated assistant;

determining, in response to identifying the first action intent request, that the first action intent request identifies: a first requested action to be performed, content data to be accessed for performing the first requested action, and an identifier that is associated with an application at the client device that at least partially caused the first action intent request to be available to the automobile computer system, wherein the separate client device includes another application that was provided by a different third party relative to a third party that provided the application at the client device, and wherein the automobile computer system is void of an installed application provided by the third party;

identifying, by the automobile automated assistant, a separate action intent request that was generated at the separate client device;

causing, in furtherance of the first requested action to be performed, an automated assistant interface accessible to the automobile computer system to provide an output to a user of the automobile computer system, wherein the output is based on the content data of the first action intent request;

determining, by the automobile automated assistant, that the user provided an input in response to the output provided at the automated assistant interface;

providing, in response to determining that the user provided the input, a second action intent request to the client device, wherein the second action intent request identifies: a second requested action to be performed at the client device, other content data that is based on the input provided by the user, and the identifier; and causing the second requested action to be performed at the client device according to the second action intent request, wherein the second requested action is performed by the application using the other content data, and the application is identified by the client device using the identifier provided in the second action intent request.

2. The method of claim 1, further comprising:

providing, in response to determining that the user provided the input, a third action intent request to the client device, the third action intent request identifying the identifier and a third requested action, wherein, in response to the client device receiving the third action intent request, the third action intent request causes a pendency of the second action intent request at the client device to be dismissed.

3. The method of claim 2, further comprising:
causing, in response to determining that the user provided the input, a dismissal of a separate pendency of a corresponding instance of the second action intent request, wherein the corresponding instance of the second action intent request is provided at the automobile computer system.

4. The method of claim 3, wherein the pendency of the second action intent request is indicated by a first automated assistant event handler accessible via the client device, and the separate pendency of the corresponding instance of the second action intent request is indicated by a second automated assistant event handler accessible via the automobile computer system.

5. The method of claim 1, wherein the separate action intent request includes another identifier generated by the separate client device, and the method further comprises:
designating, based on a difference between the identifier and the other identifier, the first action intent request as a priority over the separate action intent request.

6. A method implemented by one or more processors, the method comprising:
connecting, using an automobile computer system, with a first client device via a wireless communication modality, the first client device comprising a client automated assistant, and the automobile computer system comprising an automobile automated assistant and an automobile sensor application, the automobile sensor application configured to monitor at least one sensor of the automobile computer system;
connecting, using the automobile computer system, with a second client device via the wireless communication modality, wherein the second client device is separate from the first client device and includes another client automated assistant;
determining, by the automobile computer system, that a first action intent request was generated at the first client device by an application, wherein the application corresponds to a particular category of service and is provided by a first service provider;
determining, by the automobile computer system, that a second action intent request was generated at the second client device by another application, wherein the other application corresponds to the particular category of service and is provided by a second service provider that is different from the first service provider, and the second action intent request is separate from the first action intent request;
determining, using the automobile computer system, that a third action intent request was generated at the automobile sensor application, wherein the third action intent request is generated based on sensor data from the at least one sensor of the automobile computer system;
generating, by the automobile automated assistant, data indicating a pendency of each action intent request of the first action intent request, the second action intent request, and the third action intent request, wherein the data is stored at the automobile computer system; and
causing, according to the data, one or more interfaces connected to the automobile computer system to provide a notification for each action intent request of the first action intent request, the second action intent request, and the third action intent request.

7. The method of claim 6, further comprising:
processing, for each action intent request of the first action intent request and the second action intent request, content of each message embodied by each action intent request, wherein the processing of the content of each message is performed inattentive of whether each message was provided by a service provider of the first service provider and the second service provider.

8. The method of claim 6, wherein generating the data indicating the pendency of each action intent request includes:
generating, by the automobile automated assistant, a corresponding instance of each action intent request of the first action intent request, the second action intent request, and the third action intent request.

9. A system, comprising:
one or more processors; and
memory configured to store instructions that, when executed by the one or more processors, cause the one or more processors to perform operations that include:
identifying, by an automobile automated assistant, a first action intent request that is generated at a client device, the client device and a separate client device being paired with an automobile computer system via a wireless communication channel, wherein the automobile computer system includes the automobile automated assistant;
determining, in response to identifying the first action intent request, that the first action intent request identifies: a first requested action to be performed, content data to be accessed for performing the first requested action, and an identifier that is associated with an application at the client device that at least partially caused the first action intent request to be available to the automobile computer system,
wherein the separate client device includes another application that was provided by a different third party relative to a third party that provided the application at the client device, and
wherein the automobile computer system is void of an installed application provided by the third party;
identifying, by the automobile automated assistant, a separate action intent request that was generated at the separate client device;
causing, in furtherance of the first requested action to be performed, an automated assistant interface accessible to the automobile computer system to provide an output to a user of the automobile computer system, wherein the output is based on the content data of the first action intent request;
determining, by the automobile automated assistant, that the user provided an input in response to the output provided at the automated assistant interface;
providing, in response to determining that the user provided the input, a second action intent request to the client device, wherein the second action intent request identifies: a second requested action to be performed at the client device, other content data that is based on the input provided by the user, and the identifier; and
causing the second requested action to be performed at the client device according to the second action intent request, wherein the second requested action is performed by the application using the other content data, and the application is identified by the client device using the identifier provided in the second action intent request.

10. The system of claim 9, wherein the operations further include:

provinding, in response to determining that the user provided the input, a third action intent request to the client device, the third action intent request identifying the identifier and a third requested action, wherein, in response to the client device receiving the third action intent request, the third action intent request causes a pendency of the second action intent request at the client device to be dismissed.

11. The system of claim 10, wherein the operations further include:

causing, in response to determining that the user provided the input, a dismissal of a separate pendency of a corresponding instance of the second action intent request, wherein the corresponding instance of the second action intent request is provided at the automobile computer system.

12. The system of claim 11, wherein the pendency of the second action intent request is indicated by a first automated assistant event handler accessible via the client device, and the separate pendency of the corresponding instance of the second action intent request is indicated by a second automated assistant event handler accessible via the automobile computer system.

* * * * *